United States Patent
Iqbal et al.

(10) Patent No.: US 12,524,280 B2
(45) Date of Patent: **\*Jan. 13, 2026**

(54) TECHNIQUES FOR CONSISTENT MULTI-TENANT BEHAVIOR IN MICROSERVICES BASED APPLICATIONS

(71) Applicant: Oracle International Corporation, Redwood Shores, CA (US)

(72) Inventors: Arif Iqbal, Fremont, CA (US); Dhiraj D. Thakkar, Foster City, CA (US); Ananya Chatterjee, West Bengal (IN)

(73) Assignee: Oracle International Corporation, Redwood Shores, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/769,105

(22) Filed: Jul. 10, 2024

(65) Prior Publication Data
US 2024/0362081 A1    Oct. 31, 2024

Related U.S. Application Data

(63) Continuation of application No. 18/231,748, filed on Aug. 8, 2023, now Pat. No. 12,067,426, which is a (Continued)

(30) Foreign Application Priority Data

Apr. 26, 2021   (IN) .............................. 202141019036

(51) Int. Cl.
*G06F 9/50* (2006.01)
*H04L 67/10* (2022.01)
(Continued)

(52) U.S. Cl.
CPC .......... *G06F 9/5077* (2013.01); *G06F 9/5027* (2013.01); *H04L 67/10* (2013.01);
(Continued)

(58) Field of Classification Search
CPC ..... G06F 9/5077; G06F 9/5027; H04L 67/10; H04L 67/63; H04L 67/133; G05B 2219/2642
See application file for complete search history.

(56) References Cited

U.S. PATENT DOCUMENTS

| | | |
|---|---|---|
| 9,898,549 B1 | 2/2018 | Stamen |
| 10,250,453 B1 | 4/2019 | Singh |
| (Continued) | | |

FOREIGN PATENT DOCUMENTS

CN    112328387    2/2021

OTHER PUBLICATIONS

Uber Blog, "Why We Leverage Multi-tenancy in Uber's Microservice Architecture", p. 7, Total 11 Pages, Mar. 11, 2020 (Year: 2020).\*
(Continued)

*Primary Examiner* — Brian J. Gillis
*Assistant Examiner* — Chhian (Amy) Ling
(74) *Attorney, Agent, or Firm* — Kilpatrick Townsend & Stockton LLP

(57) ABSTRACT

Techniques are disclosed for using a multi-tenant framework for microservices in a microservices-based application to implement a tenant-aware distributed cache. The microservices-based application can include at least one microservice that incorporates the multi-tenant framework. The multi-tenant framework includes software components configured to provide multi-tenant functionality for the microservice. A microservice may receive first request associated with a tenant and comprising tenant context data. A first software component of the multi-tenant framework can extract the tenant context data from the request. The microservice can receive a second request comprising request data. A second software component of the multi-tenant framework can use the tenant context data to store the request data in a cache.

20 Claims, 12 Drawing Sheets

Related U.S. Application Data continuation of application No. 17/512,625, filed on Oct. 27, 2021, now Pat. No. 11,782,767.

(51) Int. Cl.
*H04L 67/63* (2022.01)
*H04L 67/133* (2022.01)

(52) U.S. Cl.
CPC ...... *H04L 67/63* (2022.05); *G05B 2219/2642* (2013.01); *H04L 67/133* (2022.05)

(56) References Cited

U.S. PATENT DOCUMENTS

| | | | |
|---|---|---|---|
| 11,019,073 B2* | 5/2021 | Baird | H04L 63/083 |
| 2018/0069806 A1 | 3/2018 | Kumar | |
| 2018/0083956 A1 | 3/2018 | Subramanian | |
| 2019/0034460 A1 | 1/2019 | Eberlein | |
| 2019/0095241 A1 | 3/2019 | Ago | |
| 2019/0102206 A1 | 4/2019 | Fichtenholtz | |
| 2019/0205255 A1* | 7/2019 | Hansen | G06F 12/0891 |
| 2019/0243665 A1 | 8/2019 | Bolik | |
| 2021/0149822 A1* | 5/2021 | Robinson | G06F 12/0828 |

OTHER PUBLICATIONS

Abstracting Spring Cloud Stream Producer and Consumer Code, Stack Overflow, Available Online at: https://stackoverflow.com/questions/61317136/abstracting-spring-cloud-stream-producer-and-consumer-code, Apr. 20, 2020, 2 pages.

Elegant Multi-Tenancy for Microservices—Part III: Implementation & Supporting Infrastructure, Integral, Available Online at: https://medium.com/@Integral_io/elegant-multi-tenancy-for-microservices-part-iii-implementation-supporting-infrastructure-64b74093615, Mar. 9, 2018, 6 pages.

Multitenancy-Get Tenant in Microservices Architecture, Stack Exchange, Available Online at: https://softwareengineering.stackexchange.com/questions/418018/multitenancy-get-tenant-in-microservices-architecture, Oct. 16, 2020, 2 pages.

SaaS Lens AWS Well-Architected Framework, Amazon Web Services, Available Online at: https://docs.aws.amazon.com/wellarchitected/latest/saas-lens/wellarchitected-saas-lens.pdf, Dec. 3, 2020, 58 pages.

Gud, Why We Leverage Multi-tenancy in Uber's Microservice Architecture, Uber Engineering, Available Online at: https://eng.uber.com/multitenancy-microservice-architecture/, Mar. 11, 2020, 15 pages.

Merken, asp.net Core: Microservices and Multi-tenancy, Available Online at: https://maartenmerken.medium.com/asp-net-core-microservices-and-multi-tenancy-8761e62ef189, Jan. 7, 2020, 20 pages.

Nguyen et al., Using Microservices for Non-Intrusive Customization of Multi-tenant SaaS, ESEC/FSE: Proceedings of the 27th ACM Joint Meeting on European Software Engineering Conference and Symposium on the Foundations of Software Engineering, Aug. 26-30, 2019, pp. 905-915.

* cited by examiner

TECHNIQUES FOR CONSISTENT MULTI-TENANT BEHAVIOR IN MICROSERVICES BASED APPLICATIONS

CROSS-REFERENCE TO RELATED APPLICATIONS

This application is a continuation application of U.S. patent application Ser. No. 18/231,748, filed on Aug. 8, 2023, now U.S. Pat. No. 12,067,426, and entitled "TECHNIQUES FOR CONSISTENT MULTI-TENANT BEHAVIOR IN MICROSERVICES BASED APPLICATIONS," which is a continuation application of U.S. patent application Ser. No. 17/512,625, filed on Oct. 27, 2021, now U.S. Pat. No. 11,782,767, entitled "TECHNIQUES FOR CONSISTENT MULTI-TENANT BEHAVIOR IN MICROSERVICES BASED APPLICATIONS," and claims priority to India patent application No. 202141019036, filed on Apr. 26, 2021, entitled "Development Approach for Microservices with Consistent Multi-Tenant Behavior Using Common Libraries," the disclosures of which are herein incorporated by reference in their entirety for all purposes.

BACKGROUND

In cloud computing, deployed cloud-native applications may be constituted as a collection of services each fulfilling specific functionality. These micro-services may be implemented in any number of languages and infrastructures, and therefore can have numerous interfaces with other micro-services in the application. Moreover, multi-tenancy architectures impose additional requirements on micro-services to adhere to a common contextual framework to preserve consistency within the tenancies and across the various communication protocols between the micro-services. Thus, there remain challenges in developing and deploying microservice-based applications in multi-tenant environments.

BRIEF SUMMARY

Embodiments of the present disclosure relate to providing consistent multi-tenant behavior for one or more microservices constituting an application. More particularly, some embodiments provide methods, systems, and computer-readable media that implement a multi-tenant framework for the one or more microservices, such that each microservice within an application can provide the same functionality for handling requests and operations corresponding to different tenants of a distributed computing system. The multi-tenant framework can include a plurality of modules (e.g., software components, libraries, interface definitions, etc.) to support multi-tenant functionality. The core process of each microservice may then be developed and configured without regard to multi-tenant behavior, which is handled by the multi-tenant framework modules.

One embodiment is directed to a method performed by a distributed computing system. The method can include a first microservice receiving an indication that a second microservice executing within the distributed computing system is overloaded. A microservice may be a relatively lightweight process or service configured to perform one or more specific tasks to process and/or handle user requests. The users may be associated with tenants (e.g., customers) of the distributed computing system. The microservice can include a multi-tenant framework that can include a plurality of software components configured to perform multi-tenant functions for the microservice. The indication may be received at an interface of the first microservice. The indication may be associated with a tenant of the distributed computing system. The interface can be a representational state transfer (REST) interface, a remote procedure call (RPC) interface, or messaging interface. The method can also include the first microservice receiving a request associated with a second tenant of the distributed computing system. The request can contain tenant context data. The tenant context data may in turn include a tenant identifier, a user identifier, a tracing identifier, or other identifier corresponding to the tenant, tenancy, or service instance of the application. The request can also include information that allows the first microservice to generate a second request to the second microservice. A first software component of the multi-tenant framework can extract the tenant context data from the request and use, for example, the tenant identifier to set the tenant context for the microservice. The method also includes determining whether the tenant context data corresponds to the tenant. If the tenant context data does correspond to the tenant, the first microservice can trigger a circuit breaker. In this way, tenant requests for the application that are overloading the second microservice may not be processed or executed within the application.

Another embodiment is directed to a distributed computing system including one or more processors and one or more memories storing computer-executable instructions that, when executed with the one or more processors, cause the distributed computing system to preform operations of the method described above.

Another embodiment is directed to non-transitory computer readable medium storing computer-executable instructions that, when executed by one or more processors, cause a distributed computing system to perform operations of the method described above.

DETAILED DESCRIPTION

Figure 1:
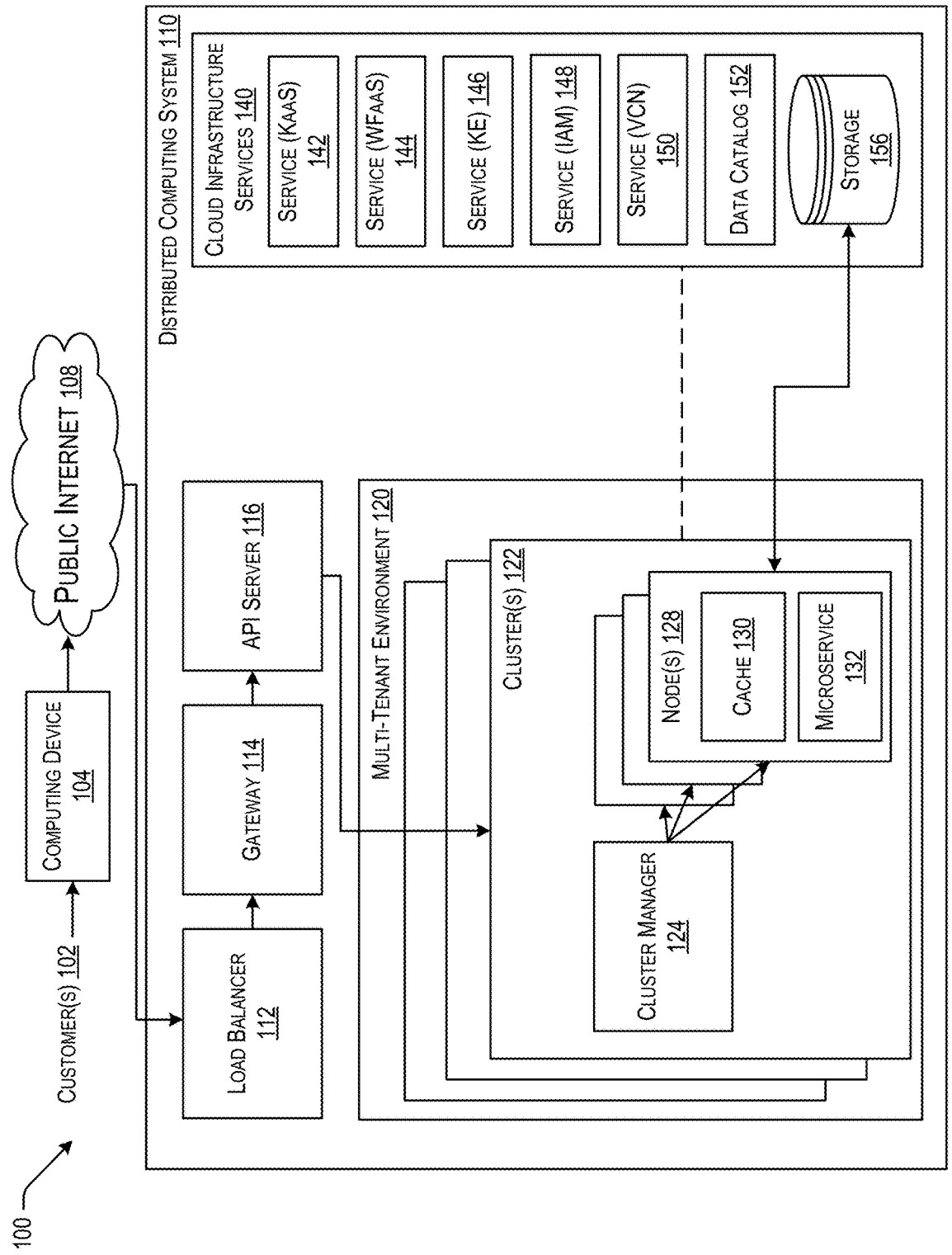
FIG. 1 illustrates a distributed computing system in a cloud computing environment that includes a multi-tenant microservices-based application, according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Microservice architecture is one design paradigm for developing applications within a distributed computing system, including many cloud computing systems. In particular, microservices allow developers to compose applications from a number of lightweight, loosely coupled services that provide a specific core functionality to the application. The use of microservices allows for modular and scalable application development in which individual microservices are independently maintained to allow for continuous delivery of the overall software service of the application.

Within a distributed computing system, a cloud services provider (e.g., a provider of a distributed computing system) can implement infrastructure that allows for the deployment of applications and software services to multiple different customers (e.g., tenants) of the distributed computing system. More granularly, tenants can deploy multiple instances of services within the distributed computing system, such that each service instance may make requests of other services and components. Both service instances and tenants may be included in the terms "tenant" and "multi-tenant," as used herein. In multi-tenant environments, the software applications may be deployed (e.g., via a backend cluster) in such a way to make use of the underlying infrastructure (e.g., computing resources, storage resources, etc.) and provide per-tenant services based on tenant requests. The applications may be composed of tens or hundreds of individual microservices. Because the microservices may be individually maintained but must correctly serve any number of tenants, developing consistent multi-tenant functionality between several microservices can require significant additional time and resources. Moreover, a microservice may be deployed in different applications provided to a different set of tenants, such that modifying the microservices to correctly function in an arbitrary application context would be prohibitive.

Techniques described herein are directed to methods, systems, and computer-readable storage media for providing a consistent multi-tenant framework for microservices deployed in a distributed computing system. Each microservice deployed as a component of an application can incorporate the multi-tenant framework. The multi-tenant framework can be configured to extract tenant context data (e.g., tenant identification, user identification, etc.) from requests received by a microservice and inject tenant context data into requests generated by the microservice. In addition, the multi-tenant framework can provide functionality for identifying and interacting with tenant-specific resources (e.g., databases, caches, circuit breakers, etc.) within the distributed computing system.

A distributed computing system may include a computing cluster of connected nodes (e.g., computers, servers, virtual machines, etc.) that work together in a coordinated manner to handle various requests (e.g., application requests, requests for storage of microservice, application, or other tenant data, etc.) by any suitable number of tenants. As used herein, a "computing node" (also referred to as a "worker node" and/or simply "node") may include a server, a computing device, a virtual machine, or any suitable physical or virtual computing resource configured to perform operations as part of a computing cluster. For example, a computing cluster may include a node for one or more microservices constituting an application. In some embodiments, a node can perform any suitable operations related to executing the one or more microservices on the node. In addition, other nodes may perform operations corresponding to managing the cluster, including load balancing, node provisioning, node removal, or other suitable operations.

The multi-tenant framework can include modules, interfaces, and/or other software components, which can allow the core microservice functionality to be developed and deployed in a tenant-agnostic manner. For example, a microservice for managing inventory can receive a request from a tenant to update an inventory record. The record may correspond to the tenant's specific data and data store, while the core functionality of the inventory management microservice is to transact with a data store to update a record according to a request payload. Thus, the core microservice functionality may not provide mechanisms to identify a request as corresponding to the particular tenant. The multi-tenant framework can provide the appropriate software to capture the tenant context data from the inbound request, identify the tenant's inventory data store, and inject outbound requests to the data store with the appropriate tenant context.

The tenant context data typically includes identification information for the tenant, service instance, and/or user associated with the request. Tenant context data may be used as part of authentication and/or authorization of user requests to an application or microservice. Tenant context data can also include a tracing identifier to facilitate deployment of microservices incorporating the multi-tenant framework. To identify tenant-specific data stores, databases, data sources, or similar resources, the multi-tenant framework can, in some embodiments, retrieve additional tenant context data, which can include tenant specific database configuration information (e.g., database name, database driver, tenant schema, tenant schema password, etc.) or service instance details (e.g., service instance identifier, identity management tenant identifier, etc.). Retrieving the additional tenant context data may be performed in conjunction with a tenant management microservice operating within the cluster.

In addition to facilitating the storing of tenant microservice and/or application data, the multi-tenant framework can, in some embodiments, provide tenant-specific caching of local data within the cluster and/or nodes of the cluster. For example, each node within a cluster may provide a cache usable by processes hosted within the node for caching data. Alternatively, or additionally, a distributed cache may be provided such that cache resources are distributed among several nodes within the cluster. To cache tenant-specific data, the multi-tenant framework can inject tenant context data into a request for caching, such that the cached data includes tenant context data (e.g., tenant identifier). When retrieving data from the cache (e.g., based on a second request), the multi-tenant framework may only retrieve data that includes tenant context data that matches the tenant context data of the request. In this way, the microservice can cache and retrieve data for multiple tenants within the same local or distributed cache without modifications to the core microservice functionality.

In some embodiments, the multi-tenant framework can also provide tenant specific circuit breaking for the microservice. Inter-service traffic (e.g., requests between microservices of an application) may exceed limits on one or more microservices to process the requests. The limits can be based on parameters corresponding to particular tenants. For example, limits can include response time thresholds for responding to a request or a maximum number of requests that can be processed within a given timeframe. Different tenants may impose different limitations on the request traffic for microservices within a tenant application. Exceeding the limits may cause reduced performance in the limited microservice (e.g., because it is unable to process requests in a timely manner) and for upstream and downstream microservices (e.g., because they are waiting for responses from the limited microservice). To mitigate the performance reduction, circuit breaker policies may be implemented within a cluster (e.g., at various application programming interfaces of the microservices) to reduce or limit request traffic. For example, a microservice may become overloaded with request traffic from a tenant. Although overloaded with regard to the tenant, the microservice may be able to respond other requests from different tenants. An upstream microservice of the application can receive an indication that the microservice is overloaded. If the upstream microservice would send a request to the overloaded microservice (e.g., based on an upstream request that includes the tenant context data for the overloading tenant) the multi-tenant framework can delay or not send the request to the overloaded microservice in accordance with a circuit breaker policy. The upstream microservice may send requests from a different tenant as normal.

Incorporating a consistent multi-tenant framework for microservices provides numerous advantages over conventional techniques. As mentioned briefly above, microservices may be individually maintained, such that a particular microservice would implement a particular method for handling multi-tenancy within the distributed computing system. This particular method may be different for different microservices, even in cases where the implementation of the multi-tenancy requirements is defined by a single specification (e.g., a contract). The differences may result poor request handling by a microservice, which in turn may result in increased traffic between microservices due to error-handling, request retries, and the like. Providing a consistent multi-tenant framework reduces the computational burden on the distributed computing system by minimizing errors in requests between microservices. The multi-tenant framework can also allow for an existing application to expand or be updated by the addition of a new microservice, which can be implemented without modification of the existing microservices already deployed. In addition, a consistent multi-tenant framework may keep the microservices lightweight, and thus reduce their computational footprint (e.g., computational resource consumption) by preventing inefficient multi-tenancy implementations for different microservices within the same application.

Turning now to the figures, FIG. 1 depicts a distributed computing system 110 in a cloud computing environment 100 that includes a multi-tenant microservices-based application, according to some embodiments. The distributed computing system 110 may be implemented by one or more computing systems that execute computer-readable instructions (e.g., code, program) to implement the distributed computing system. As depicted in FIG. 1, the distributed computing system 110 includes various systems including a load balancer 112, a gateway 114 (e.g., a multi-tenant gateway), an Application Programming Interface (API) server 116, and one or more computing cluster(s) 122. Portions of data or information used by or generated by the systems shown in FIG. 1 may be stored in the storage system 156. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The distributed computing system 110 may be implemented in various different configurations. In the embodiment shown in FIG. 1, the distributed computing system 110 may be implemented on one or more servers of a cloud provider network and its multi-tenant services may be provided to subscribers of cloud services on a subscription basis. The computing environment 100 comprising the distributed computing system 110 depicted in FIG. 1 is merely an example and is not intended to unduly limit the scope of claimed embodiments. One of ordinary skill in the art would recognize many possible variations, alternatives, and modifications. For example, in some implementations, the distributed computing system 110 can be implemented using more or fewer systems than those shown in FIG. 1, may combine two or more systems, or may have a different configuration or arrangement of systems.

In some embodiments, a computing cluster (e.g., cluster 122) may be executed within a multi-tenant environment 120 for one or more tenants or customers of the distributed computing system 110. Different computing clusters may be associated with a tenant. One or more different computing clusters may be associated with additional tenants. A cluster may be configured to perform operations in a coordinated fashion utilizing any suitable number of computing nodes. As previously noted, a "computing node" (also referred to herein as a "node") may include a server, a computing device, a virtual machine, or any suitable physical or virtual computing resource configured to perform operations as part of the computing cluster. By way of example, a cluster 122 may include a plurality of nodes including a cluster manager node 124 and one or more node(s) 128, both being examples of computing nodes. In some embodiments, the cluster manager node 124 performs any suitable operations related to managing the cluster 122, such as load balancing, node provisioning, node removal, or other similar operation. One or more node(s) 128 may be configured to execute an application that includes one or more microservices (e.g., microservice 132). As a non-limiting example, node(s) 128 can execute microservices-based applications accessible to one or more tenants of the distributed computing system 110. The node(s) 128 can include a cache 130, which may be accessible to one or more microservices hosted within the node(s) 128. The cache 130 may be a local storage resource (e.g., provisioned for the node) or part of a distributed storage resource (e.g., accessible from multiple node(s) 128).

Cloud computing resources allocated to a tenant of the distributed computing system 110 are selected from a plurality of cloud-based resources that are arranged in a hierarchical manner. For instance, as shown in FIG. 1, the resources can be a pool of cloud infrastructure services 140. The cloud infrastructure services 140 can include key-value database as a service (KaaS) 142, workflow as a service (WFaaS) 144, Kubernetes engine (KE) 146, identity and access management (IAM) services 148, virtual cloud network (VCN) 150, and a data catalog 152. The Kubernetes engine (KE) 146 service may be used to create, manage, update, and provision the cluster(s) 122 (e.g., one or more Kubernetes clusters).

According to some embodiments, a manager node (e.g., cluster manager node 124) in a computing cluster (e.g., cluster 122) may be configured to execute a driver program (also referred to as a driver module, driver process, or simply driver, i.e., the process running an application that is built on the computing cluster) and may execute operations to create the application's context. An "application" may refer to a complete, executable driver program that is run as an independent process and coordinated by the application's context in the driver program executed in the cluster manager node 124. The application's context may allow the cluster manager 124 to allocate system resources to all the nodes in the cluster. Each node (e.g., node(s) 128) in the cluster 122 may be managed by one or more processes launched on the worker node(s) 128 to perform operations corresponding to a task assigned to the node. The cluster manager 124 within a computing cluster may be implemented using a container orchestration platform such as Kubernetes or another cluster management solution such as Apache Mesos, Hadoop YARN, or the like.

Within each node (e.g., node(s) 128), one or more containers may be deployed to host running processes or other programs, including one or more microservices (e.g., microservice 132). The container orchestration platform (e.g., Kubernetes) can configure the containers to execute the microservices. Containers can correspond to container runtimes (e.g., Docker, Kubernetes runtime, Containerd, etc.), which can include the necessary software (e.g., application libraries, system libraries, configuration settings, etc.) for executing the microservices or other applications, processes, or programs to be hosted within the container. Typically, each microservice within a microservice-based application may be hosted within a separate container. Modifications to the application (e.g., adding a microservice) can include adding an additional container to the node.

In some embodiments, the data storage system 156 can include any of a variety of data storage systems, and may represent data stores, data warehouses, databases, object storage, and the like for one or more tenants. As a particular example, the data storage system 156 may be implemented as a cloud-based database service (e.g., Oracle Autonomous Transaction Processing), with provisioning, configuring, managing, and other operations related to maintaining the database are provided by a cloud-services provider.

In certain embodiments, a user (e.g., a customer 102) may interact with the distributed computing system 110 via a computing device 104 that is communicatively coupled to the distributed computing system 110 possibly via a public network 108 (e.g., the Internet). The computing device 104 may be of various types, including but not limited to, a mobile phone, a tablet, a desktop computer, and the like. A user may interact with the cloud computing system using a console user interface (UI) (which may be a graphical user interface (GUI)) of an application executed by the computing device or via API operations provided by the distributed computing system 110. For instance, the user may interact with the distributed computing system 110 to create one or more computing clusters, access or interact with a microservices-based application, store data related to the application, and retrieve data related to one or more requests. In some embodiments, the customer(s) 102 can be systems and processes of a tenant (e.g., customer programs) outside of the distributed computing system 110 (e.g., local customer systems).

As an example, a user associated with a tenant of the distributed computing system 110 may interact with the distributed computing system 110 by transmitting a request to the distributed computing system 110 to interact with an application executing on one or more of the cluster(s) 122. The request may be received by a load balancer 112 in the distributed computing system 110 which may transmit the request to a multi-tenant proxy service, for example gateway 114, within the distributed computing system. The gateway 114 may be responsible for authenticating/authorizing the user's request and routing the request to an API server 116 that may be configured to execute operations for managing requests to the computing cluster(s) 122. In certain examples, the gateway 114 may represent a shared multi-tenant Hyper Text Transfer Protocol (HTTP) proxy service that authorizes the user and submits the user's request to the API server 116 to interact with the cluster (e.g., enable the creation of a computing cluster for the tenant, modify or update one or more clusters, etc.) or pass requests into the cluster to one or more node(s) 128.

To facilitate execution of microservices-based applications within the cluster(s) 122, the cluster(s) 122 within the distributed computing system 110 may include capabilities to cache the data required for application processes in-memory (also referred to herein as "cache memory" or a "cache") in the different nodes of a cluster. For instance, the cache (e.g., cache 130) may represent a small amount of dynamic random access memory (DRAM) which is very fast and expensive, located close to the central processing unit of the computing node. In certain embodiments, the nodes within a cluster are provided with capabilities of storing tenant-specific data within the cache 130. In particular, a microservice (e.g., microservice 132) within an application may cache tenant-specific application or microservice data in a manner that identifies the data as corresponding to the tenant (e.g., by storing a tenant identifier, a user identifier, or similar identifier or piece of data). The core microservice process may not be configured to perform the tenant-specific caching operations. Instead, a multi-tenant framework implemented by the microservice may perform the tenant-specific caching operations (e.g., by injecting tenant context data into the cache with the microservice data to be stored). The core microservice process may thus operate to cache data in the same manner without regard to a particular tenant context, while a module of the multi-tenant framework handles striping the cache for the particular tenant associated with the caching operation request.

Figure 2:
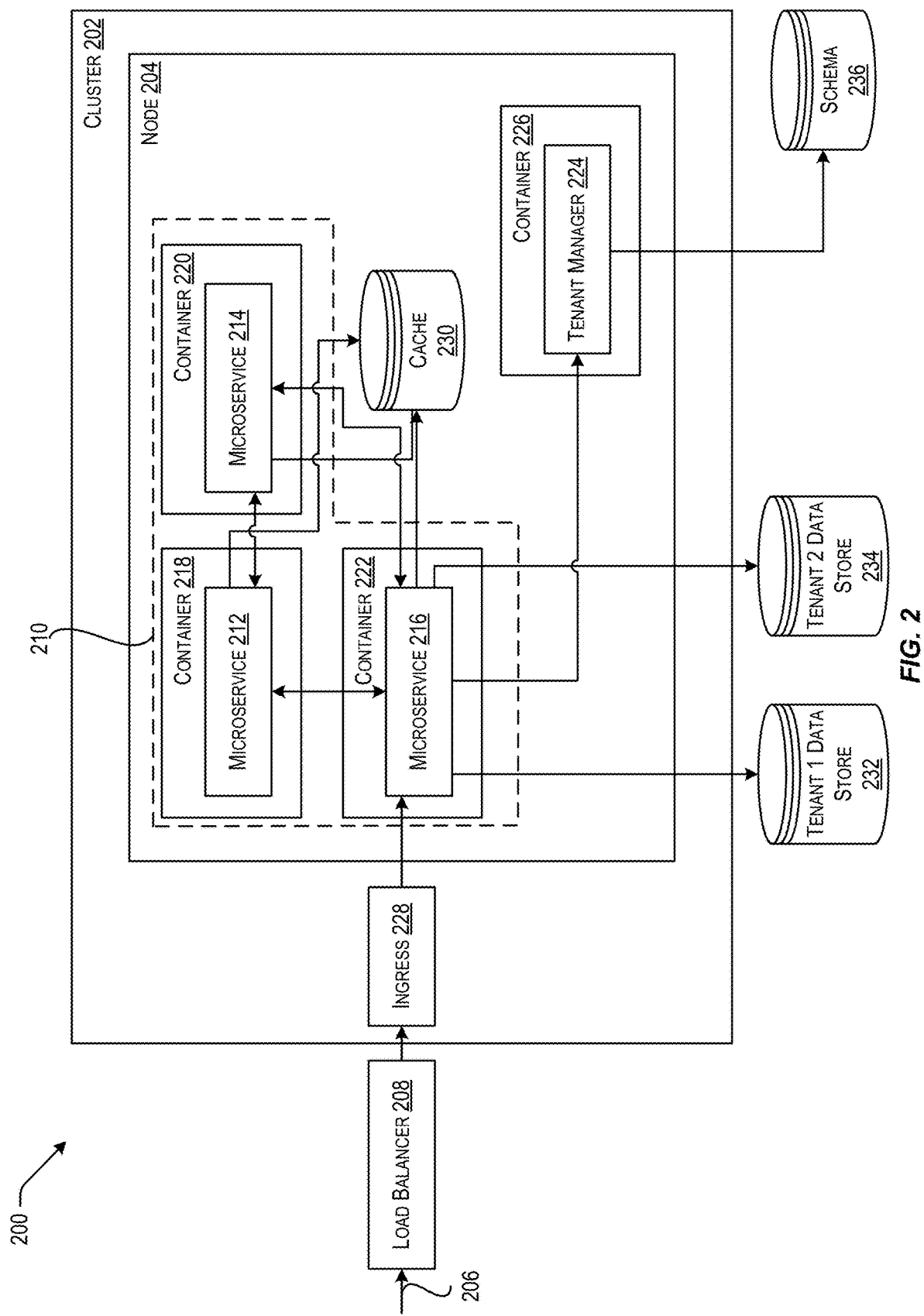
FIG. 2 illustrates a cluster of computing nodes in a distributed computing system implementing a multi-tenant microservices-based application, according to some embodiments.

FIG. 2 illustrates a cluster 202 containing a computing node 204 in a distributed computing system 200 implementing a multi-tenant microservices-based application 210, according to some embodiments. microservices-based application 210 may be any application or service (e.g., a web service) for which a microservice architecture is suitable. The cluster 202 and node 204 may be an example of one of the cluster(s) 122 and node(s) 128 of FIG. 1, while cache 230 may be an example of cache 130. The cluster 202 may host any suitable number of nodes, including node 204. Node 204 may similarly host any suitable number of microservices that constitute the microservices-based application 210, including microservices 212-216. Within a cluster, the microservices may reside each with its own container. As depicted, microservice 212 is within container 218, microservice 214 is within container 220, and microservice 216 is within container 222. Depending on the cluster configuration or application architecture, the node 204 may contain more or fewer containers and microservices than depicted in FIG. 2.

As described above, the containers 218-222 may be configured to provide suitable runtimes and other code for executing the application contained within (e.g., microservices 212-216). The containers may utilize well-defined communications channels to communicate with one another, such that the container services can transmit and receive calls, requests, messages, and other communications as part of the execution of the overall microservices-based application 210. Although arrows are used within FIG. 2 to generally indicate a flow of information, data, requests, or other connection between the different objects described, the arrows should not be construed to connote any particular configuration or arrangement of the elements therein.

In some embodiments, the distributed computing system 200 can include a load balancer 208. The load balancer 208 may be configured to receive requests (e.g., request 206) and distribute the requests to one or more clusters (e.g., cluster 202). The requests may be user or customer requests sent over a public network (e.g., public internet 108). The requests may comport with representational state transfer (REST) principles. For example, the request 206 may be sent using hypertext transfer protocol (HTTP). An HTTP request can include a header containing information associated with the requesting user, including user identifiers, host domain name service (DNS) identifiers, authorization information, other client information, payload information, and the like. The load balancer 208 may be configured to inject a tenant identifier or other tenant context data into a RESTful request (e.g., into the header of request 206) as part of load balancing operations, so that the request arrives at the cluster (e.g., cluster 202) with the appropriate context. RESTful requests may be received at an application programming interface (API) exposed by the cluster (e.g., by ingress 228), the microservices (e.g., microservices 212-216), or other object within the distributed computing system 200.

In some embodiments, ingress 228 may be an ingress API object to provide request routing within the cluster. For example, ingress 228 can expose HTTP (or HTTPS) routes from outside the cluster to services, processes, applications, containers, and other software objects inside the cluster. Ingress 228 may provide external URLs for a service (e.g., microservices-based application 210 running in the node 204). The ingress 228 may receive the requests from load balancer 208. In some embodiments, load balancer 208 may communicate with a cloud-based identity management service (e.g., identity cloud service, IDCS) to provide tenant context (e.g., for tenants whose identity management is handled by a cloud service rather than a traditional IAM service of the distributed computing system 200). The ingress 228 may be provided as part of the container orchestration service (e.g., Kubernetes engine).

Within node 204, the microservices-based application 210 may include microservices, containers, or other processes configured to perform operations associated with an application or service. As depicted in FIG. 2, the microservices-based application 210 can include three microservices 212-216. One, any, or all of microservices 212-216 may be able to cache data using cache 230. Cache 230 may be a distributed cache (e.g., implemented using Memcached, Redis, or the like) or a local cache. Cache 230 may be usable to store data from multiple tenants. For example, microservice 216 may store a small portion of tenant data (e.g., a tenant database identifier) in cache 230. Subsequently, the microservice 216 (or another microservice of the microservices-based application 210) may retrieve the tenant data from the cache 230 for use in handling further tenant requests or other application operations.

Node 204 may also include related services accessible to the microservices-based application 210, including a tenant manager service 224 (hosted within container 226). The tenant manager service 224 may be an external service to the microservices-based application 210. The tenant manager service 224 may be configured to respond to requests from the microservices-based application 210, including via a request from one of the microservices 212-216. For example, microservice 216 may receive request 206 containing tenant context data for a first tenant. The tenant context data may include a tenant identifier. To determine tenant-specific database configuration information, the microservice 216 can send a request to tenant manager service 224 to retrieve additional tenant context data. The additional tenant context data can include database configuration information that includes, for example, a tenant database name, a database driver (e.g., identifying the appropriate driver for the tenant database, including Oracle Database Connectivity (ODBC), Java Database Connectivity (JDBC), and the like), a tenant schema name, a tenant schema password, a proxy user name, a proxy user password, a wallet (e.g., identifying a credential repository for private keys, certificates, and the like), a wallet password, and a service profile (e.g., a service profile for an autonomous database service). The additional tenant context data can also include information associated with a service instance, including a service instance identifier, an identity cloud service tenant identifier (e.g., tenant identifier for IDCS), and a compartment identifier (e.g., identifying a collection of cloud resources associated with a tenant). Database configuration information may be retrieved from a secrets service (not shown). Schema information may be retrieved from schema storage 236, which may be an instance of an autonomous database.

As discussed briefly above, the term "tenant" as used herein, particularly with regard to the term "multi-tenant," can include the concept of different service instances within a single tenancy. For example, users of a single tenant may interact with different instances of the microservices-based application 210 (e.g., different service instances) such that requests (e.g., request 206) can include service instance identifier information with respect to the service instance rather than a distinct tenant. Thus, consistent multi-tenant behavior for microservices can include handling requests according to service instance as well as tenancy.

Within the microservices-based application 210, microservices 212-216 may communicate via a number of defined communication methods, protocols, and/or channels, including remote procedure calls (RPCs, e.g., gRPC), steaming messaging (e.g., Apache Kafka), RESTful methods (e.g., HTTP), and the like. Each channel can have a corresponding interface. For example, a microservice may include a gRPC interface, a RESTful API, a client/server messaging interface, or other interface. Some microservices may be configured to send and/or receive communications via one, any, or all different channels. As used herein, within the microservices-based application 210, the various communications may be referred to generally as "requests," including specific communications like RPCs and asynchronous messages. Within the microservices-based application 210, communications between microservices should include tenant context data. tenant context data may be first injected to an inbound request 206 by the load balancer 208. A microservice may be individually configured to retrieve, store, and inject tenant context data with respect to any inbound or outbound request. However, techniques described herein may provide each microservice with a consistent multi-tenant framework for preserving tenant context data within the microservices-based application 210. For example, microservice 216 may implement a multi-tenant framework configured to extract the tenant context data from request 206 (e.g., from an inbound RESTful request). Subsequently, microservice 216 may send a message (e.g., to a messaging service), to which microservice 21 may subscribe. When sending the message, the multi-tenant framework can inject tenant context data into the message (e.g., by an interface interceptor module configured to modify outbound messages at the producer API of the messaging interface).

The distributed computing system 200 can also include tenant data stores 232, 234. Each tenant may have a corresponding data store. For example, a first tenant, Tenant 1, may be associated with Tenant 1 data store 232, while a second tenant, Tenant 2, may be associated with Tenant 2 data store 234. Tenant data stores 232, 234 may be examples of storage 156 of FIG. 1. In some embodiments, the tenant data stores 232, 234 may be instances of an autonomous data store (e.g., separate instance of Oracle ATP) One, any, or all of the microservices 212-216 may transact with the data stores. For example, microservice 216 may be an inventory microservice configured to update tenant-specific inventory data. In another example, microservice 216 may be a microservice of a digital assistant microservices-based application configured to retrieve text data corresponding to a parsing of a user query to the digital assistant. Requests to store application or microservice data at a tenant data store require identifying the correct tenant data store corresponding to the request. Tenant-specific connection pools for connecting to and transacting with a tenant data store may be provided by the multi-tenant framework of the microservices. Additional detail regarding the multi-tenant framework is provided below with respect to FIG. 3.

Figure 3:
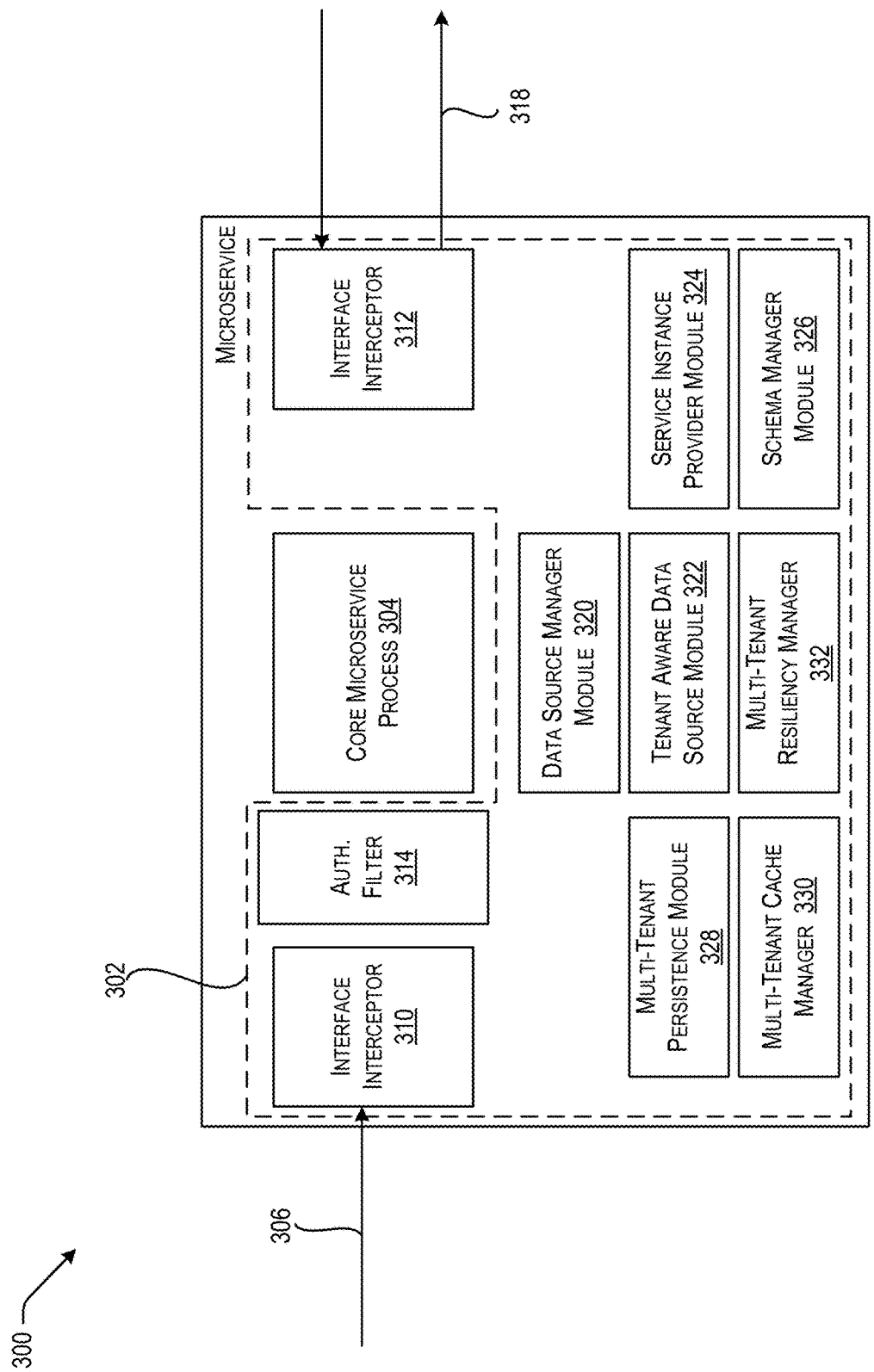
FIG. 3 illustrates an example microservice incorporating a multi-tenant framework, according to some embodiments.

FIG. 3 illustrates an example microservice 300 incorporating a multi-tenant framework 302, according to some embodiments. The microservice 300 may be an example of any other microservice described herein, including microservice 132 of FIG. 1 or microservices 212-216 of FIG. 2. The microservice 300 may be a component of a microservices-based application, including microservices-based application 210 of FIG. 2. The microservice 300 can include core microservice process 304, which may be a process for conducting the operations of the microservice. For example, the microservice 300 may be an inventory microservice, with a core microservice process including operations related to sending inventory update data to a data store. The multi-tenant framework 302 can include one or more modules to provide tenant-specific functionality to the microservice 300. In this way, the core microservice process 304 can be configured to perform operations without respect to a tenancy or service instance.

As shown in FIG. 3, microservice 300 may receive a request 306 as part of the operation of a microservices-based application including the microservice 300. The request 306 may be an example of request 206, and may be a request (e.g., a RESTful request, HTTP request, etc.), a procedure call (e.g., RPC), a message (e.g., a streaming message), or other communication within a distributed computing system. By way of example, the request 306 may be a RESTful request sent from a user of the microservices-based application including the microservice 300, such that the microservices-based application receives information (e.g., a request payload, header data, and metadata) for performing one or more operations in response to the request. The operations can include performing an operation of the core microservice process 304 (e.g., storing application, microservice, or user data at a data store) or sending a second request to another microservice in the microservices-based application. For example, the microservice 300 may send a second request 318 to another microservice within the microservices-based application. The second request 318 may be an RPC to execute a procedure or operation by the other microservice. The second request 318 may also be any other type of request described herein suitable for communicating between microservices, services, applications, or other computing components within the distributed computing system.

The microservice 300 may expose one or more interfaces for the communication channels used during operation of the microservice 300. For example, the microservice 300 may include a RESTful API for receiving an external HTTP request (e.g., request 306) from a user. Similarly, the microservice 300 may include messaging APIs (e.g., producer/consumer APIs), and RPC APIs (e.g., client/server APIs). For a messaging interface, message requests may be sent from a producer interface and received at a consumer interface. For an RPC interface, calls may be sent from a server interface and received at a client interface.

The multi-tenant framework 302 can include interface interceptors 310, 312. The interface interceptors 310, 312 may be modules or similar software components of the microservice 300 that may be configured to extract or inject tenant context data from requests. For example, interface interceptor 310 may be a RESTful API filter configured to identify tenant context data within an inbound HTTP request (e.g., tenant context data in the request header) and set the tenant context for the microservice 300 (e.g., set context for the microservice thread for handling the request). The filter may also be configured to reject inbound requests that do not include the tenant context data (e.g., by sending an error in response to an external request that lacks tenant context data). The filter may also be configured to generate a tracing identifier if one is not present in the tenant context data, which can be injected into subsequent requests as part of the tenant context data. As another example, interface interceptor 312 may be a gRPC interceptor configured to inject tenant context data (e.g., a tenant identifier) into outbound RPCs and extract tenant context data from inbound RPCs. In some embodiments, interface interceptors 310, 312 can include an interceptor component for different APIs exposed for the same communication channel. For example, interface interceptor 312 may include a server-side interceptor configured to inject tenant context data in outbound calls and a client-side interceptor to extract tenant context data from inbound calls. Similarly for a messaging interface, the interface interceptor 312 may include a producer interceptor configured to inject tenant context data in outbound messages and a consumer interceptor configured to extract tenant context data from inbound messages.

In some embodiments, the multi-tenant framework 302 can include an authentication filter 314. The authentication filter 314 may be configured to perform authentication and authorization on inbound external requests by calling an authorization service within the distributed computing system. The call to the authorization service can include the tenant context data to confirm if the requesting user is authorized to make the request to the microservice 300 (or the microservices-based application that includes the microservice 300).

The multi-tenant framework 302 can include a service instance provider module 324 to request additional tenant context data. The tenant context data included in an inbound external request can include a tenant identifier. The service instance provider module 324 can use the tenant context data to request additional tenant context data from a tenant manager service (e.g., tenant manager service 224 of FIG. 2). The additional tenant context data can include database configuration information corresponding to the tenant. The additional tenant context data may be cached within a cache of the node hosting the microservice 300 (e.g., cache 230).

In some embodiments, the multi-tenant framework 302 can include a data source manager module 320. The data source manager module 320 can be configured to determine the storage configuration corresponding to a tenant (e.g., the tenant identified by tenant context data in a request). In particular, the data source manager module 320 can create and manage one or more data source connection pools for different tenants that interact with the microservice 300. A data source connection (or more simply, a "connection") may be an object specifying parameters for connecting to a database (or other data store). For example, a data source connection may specify a server name (or other identifier of a host for the database), a database name, a description, or other parameters for creating a connection. A connection pool can be one way to manage connections by allowing reuse of connections for subsequent interactions with a database. The data source manager module 320 can also provide an API to obtain a data source (e.g., a database) for a given tenant.

The data source manager module 320 can interact with a tenant aware data source module 322 of the multi-tenant framework 302 to obtain tenant-specific data source information. The tenant aware data source module 322 may be configured to provide a tenant-specific implementation of a data source interface (e.g., Java DataSource interface). For example, the tenant aware data source module 322 may user tenant context data to produce a connection corresponding to a tenant-specific database. The connection can be managed in a connection pool by data source manager module 320. Additionally, the tenant aware data source module 322 may be configured to switch schema for a tenant connection so that the connection uses a schema corresponding to the tenant associated with a request.

In some embodiments, a schema manager module 326 may be configured to create and/or upgrade a tenant database schema in response to a user request. In particular, the schema manager module 326 can create and/or upgrade the tenant schema in response to a first request to the microservice 300 from the tenant, for example as part of a bootstrapping process for tenant resources. For example, a tenant data store for application data may not be configured prior to the first tenant interaction with the application. Instead, data store instances may be configured with a default schema. The multi-tenant framework 302 can include schema change sets for different tenants. A schema change set can include changes to a database object (e.g., a schema). The schema manager module 326 can, upon receiving a first request for a tenant, perform operations to update the default schema in accordance with a tenant-specific schema change set.

In some embodiments, the cluster hosting the microservices-based application may be upgraded, which can include updates to the one or more containers hosting the microservices. As part of the cluster upgrade, the updated containers hosting the microservices can include updated schema change sets. When a microservice (e.g., microservice 300) receives a first request from a tenant following a cluster upgrade, the schema manager module 326 can perform operations to update the tenant schema in accordance with the updated schema change sets. The schema manager module 326 may incorporate schema management software (e.g., Liquibase) to perform one or more of the schema management operations.

The multi-tenant framework 302 can also include a multi-tenant persistence module 328. The multi-tenant persistence module 328 can be configured to correctly handle data persistence for a tenant. Persistence may refer to storage of application, microservice, or other process data in a data store for longer than the process lifetime of the process that created the data (e.g., data persisting longer than the instance lifetime of the application or thread). In some embodiments, the microservice 300 can employ Java persistence API (JPA, e.g., Hibernate) for data persistence.

The core microservice process 304 may be configured to process requests in a tenant-agnostic manner. For example, the request 306 may be a tenant-agnostic request that includes a SQL statement for persisting data, such that the SQL statement does not identify the tenant or tenant context. Correct handling of tenant-specific data persistence can include the multi-tenant persistence module 328 intercepting SQL executions for storing tenant data performed by the microservice 300 and injecting tenant specific information into the requests to create tenant-specific requests. For example, for a given SQL request, the multi-tenant persistence module 328 can prefix tables in the request with the current tenant's database schema. In other examples, the microservice 300 may use a schema macro in JPA entities. The schema macro may be used in SQL statements. The multi-tenant persistence module 328 can identify the macro and replace it with a tenant database schema in the SQL statement.

In some embodiments, the multi-tenant framework can include a multi-tenant cache manager 330. The multi-tenant cache manager 330 may be configured to cache microservice or application data in a cache (e.g., cache 230) striped for a corresponding tenant. For example, the multi-tenant cache manager 330 can include a tenant identifier or other tenant context data with data to be cached, such that the cache data is stored with a tenant identifier. During subsequent retrievals from the cache, the multi-tenant cache manager 330 may only retrieve data that includes a tenant identifier corresponding to the tenant for which the cached data is being retrieved. In some embodiments, the multi-tenant cache manager 330 can apply tenant-specific eviction rules to the cache. For example, one tenant may specify that cache data becomes invalid after a first time, while a second tenant may specify that cache data becomes invalid after a second time. The first tenant's invalid data may be evicted from the cache by the multi-tenant cache manager 330 after exceeding the first time.

In some embodiments, the multi-tenant framework can include a multi-tenant resiliency manager 332. The multi-tenant resiliency manager may be configured to provide tenant-specific circuit breaking policies for tenant request traffic within a microservices-based application. Different communication channels within the microservices-based application (e.g., different APIs for one or more microservices) may correspond to tenant-specific policies for request flow (e.g., request rate) or system rules. The polies may specify procedures for slowing or stopping request traffic to downstream microservices within an application based on whether a microservice is overloaded (e.g., receiving requests in excess of a policy). Policies may differ for different microservices and different tenants; such that one microservice may be overloaded with respect to one tenant's requests but retain sufficient computing resources to handle a different tenant's requests. The multi-tenant resiliency manager 332 can apply a circuit breaking policy for traffic from one tenant while allowing other tenant requests to proceed. For example, a first request from a first tenant may trigger microservice 300 to send a request to a downstream microservice (e.g., via request 318). Based on a circuit breaking policy for the first tenant, the request to the downstream microservice may exceed the policy. The multi-tenant resiliency manager 332 can then prevent the request to the downstream microservice from being sent in accordance with the policy. A second request from a second tenant may not exceed a circuit breaking policy for the second tenant. If the second request triggers the microservice 300 to send a request to the downstream microservice, the request may be sent.

Figure 4:
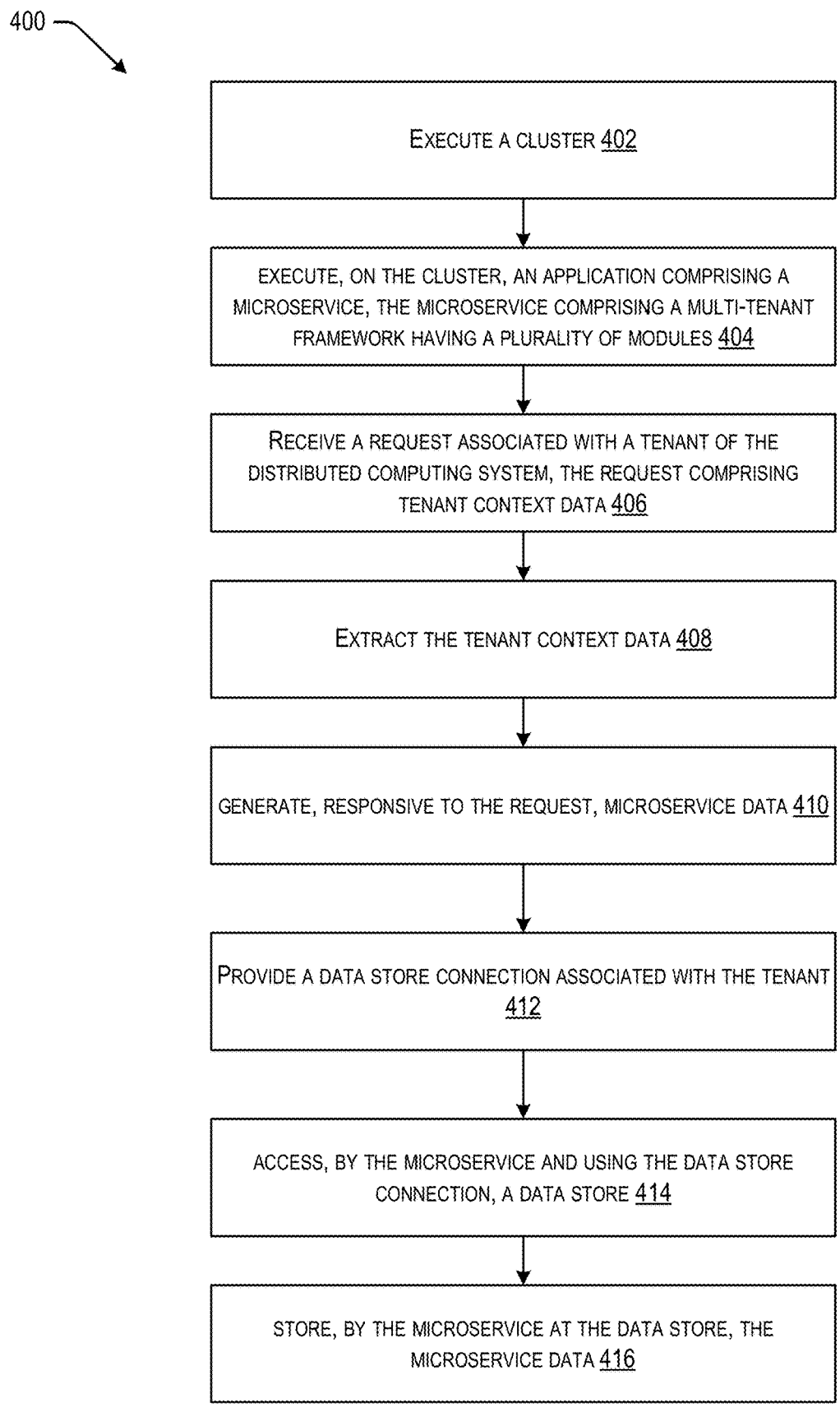
FIG. 4 is a simplified flow diagram of an example process for extracting tenant context data from a request received at a microservice and using the tenant context data to store microservice data in a tenant-specific data store, according to some embodiments.

FIG. 4 is a simplified flow diagram of an example process 400 for extracting tenant context data from a request received at a microservice and using the tenant context data to store microservice data in a tenant-specific data store, according to some embodiments. The microservice may be similar to one or more microservices described herein, including microservice 300 of FIG. 3, which may be hosted within a multi-tenant cluster on a distributed computing system, including cluster 202 and distributed computing system 200 of FIG. 2. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 400 may begin at block 402 with the distributed computing system executing a multi-tenant cluster. The cluster can include one or more nodes each hosting one or more containers. The containers in turn can host a process, including a microservice. At block 404, the distributed computing system can execute an application that includes a microservice (e.g., a microservices-based application), which may be a service accessible to users (e.g., customers) of the distributed computing system. The cluster may be managed by a container orchestration engine (e.g., Kubernetes), which may be provided as a cloud-based service for the distributed computing system. The microservice of the application can include a multi-tenant framework that can have a plurality of modules (e.g., libraries or other software components) to perform various operations as described herein.

At block 406, the microservice of the application can receive a request associated with a tenant of the distributed computing system. The request can include tenant context data. The tenant context data may contain a tenant identifier, user identifier, tracing identifier, or similar information for setting the context of the operation of the microservice (e.g., allowing the microservice to identify the tenant for whom operations are being performed). Within a multi-tenant cluster, the application can receive requests associated with multiple different tenants. Additionally, different instances of the same application may receive requests associated with a single tenant that need to be distinguished by instance (e.g., service instance) rather than tenancy.

At block 408, the microservice can extract the tenant context data from the request. A module of the multi-tenant framework (e.g., interface interceptors 310, 312) can extract a tenant identifier or other identifier of the tenant context data and set the context for the current microservice thread. In some embodiments, the module of the multi-tenant framework can determine that tenant context data is not present in the received request and reject the request (e.g., by sending an error response to the request source).

In response to the request, the microservice can perform one or more operations. The operations can result in the generation of microservice data (e.g., data to store in a tenant data store), at block 410. Generating microservice data can include creating new data or modifying existing data (e.g., cached data, data received as part of the request payload, etc.). For example, the request may be to update a tenant inventory stored in a data store, such that the microservice generates the corresponding update.

At block 412, a module (e.g., data source manager module 320, tenant aware data source module 322) of the multi-tenant framework can provide a data store connection associated with the tenant. The data store connection can be an object that specifies a data store corresponding to the tenant, including specifying the name of the data store, the host of the data store, tenant credentials for the data store, etc. The data store connection can be provided based upon the extracted tenant context data. The data store connection may be selected from a pool of connections managed by the module (e.g., by data source manager module 320). In some embodiments, the connection may be created by the module (e.g., by tenant aware data source module 322).

At block 414, the microservice can access a data store using the data store connection. The data store can correspond to the tenant (e.g., tenant instance of an autonomous data store). The connection may provide an interface for the data store transaction. At block 416, the microservice can store the microservice data at the data store. Storing the microservice data can include a transaction with the data store. Storing microservice data can include persisting the data (e.g., in conjunction with a multi-tenant persistence module 328).

Figure 5:
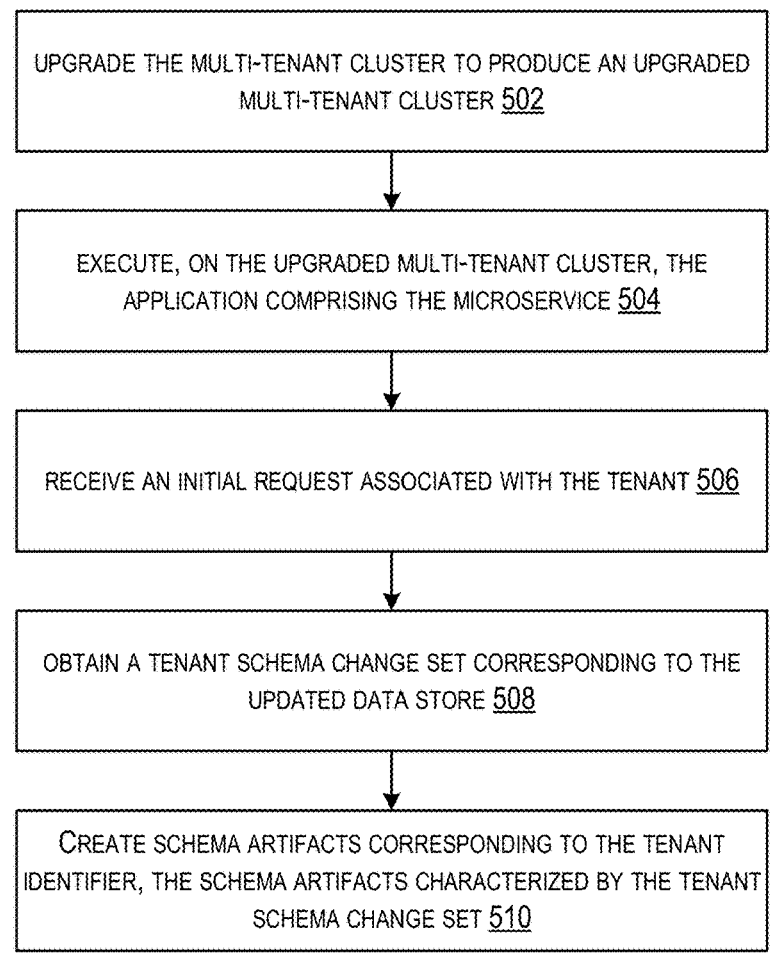
FIG. 5 is another simplified flow diagram of an example process for updating tenant database schema following an upgrade of a multi-tenant cluster, according to some embodiments.

FIG. 5 is another simplified flow diagram of an example process 500 for updating tenant database schema following an upgrade of a multi-tenant cluster, according to some embodiments. The multi-tenant cluster may be similar to other clusters described herein, including, for example, cluster 202 of FIG. 2, and hosted within a distributed computing system, for example distributed computing system 200.

Process 500 may begin at block 502 with the multi-tenant cluster being upgraded to produce an upgraded multi-tenant cluster. A cluster upgrade may include modifying the cluster (e.g., adding, modifying, or removing nodes, provisioning/deprovisioning cluster resources, etc.). The upgrade can also correspond to updates to one or more data stores associated with the tenants of the distributed computing system. For a Kubernetes cluster, a cluster upgrade may be defined by one or more updated charts that map related resources in the cluster to one another. One skilled in the art would recognize various techniques to upgrade an existing cluster. Typically, during an upgrade, existing cluster pods (e.g., groups of containers within nodes) remain online while the cluster manager creates new pods (with new containers). The new containers can include updated software components (e.g., runtime libraries), which in turn can include new or updated schema change sets.

Once the upgraded cluster resources are available, the distributed computing system can execute the application (e.g., the previously executing microservices-based application) within the upgraded cluster, at block 504. microservices within the updated containers may have access to updated schema change sets. As described previously, the schema change sets may specify differences between a default database schema and a tenant-specific database schema. To avoid the computational expense of updating each tenant's schema (e.g., modifying stored schema objects in the data store) at the time of the cluster upgrade, schema update can wait until the application receives an initial request associated with a tenant, at block 506. The initial request may be received at a microservice of the application that includes the multi-tenant framework, such that tenant context data can be extracted by a module of the multi-tenant framework and used to identify the tenant-specific data store and tenant-specific schema.

At block 508, in response to receiving the initial request for the tenant, the microservice can obtain a tenant schema change set corresponding to the updated data store. As noted above, the change set may be included in the updated container image of the container hosting the microservice. A module of the multi-tenant framework (e.g., schema manager module 326) can use the tenant schema change set to create schema artifacts within the tenant data store, at block 510. The schema artifacts can include data store objects that define the updated schema according to the change set. Specific operations of the schema upgrade may be performed using Liquibase or similar schema management framework.

Figure 6:
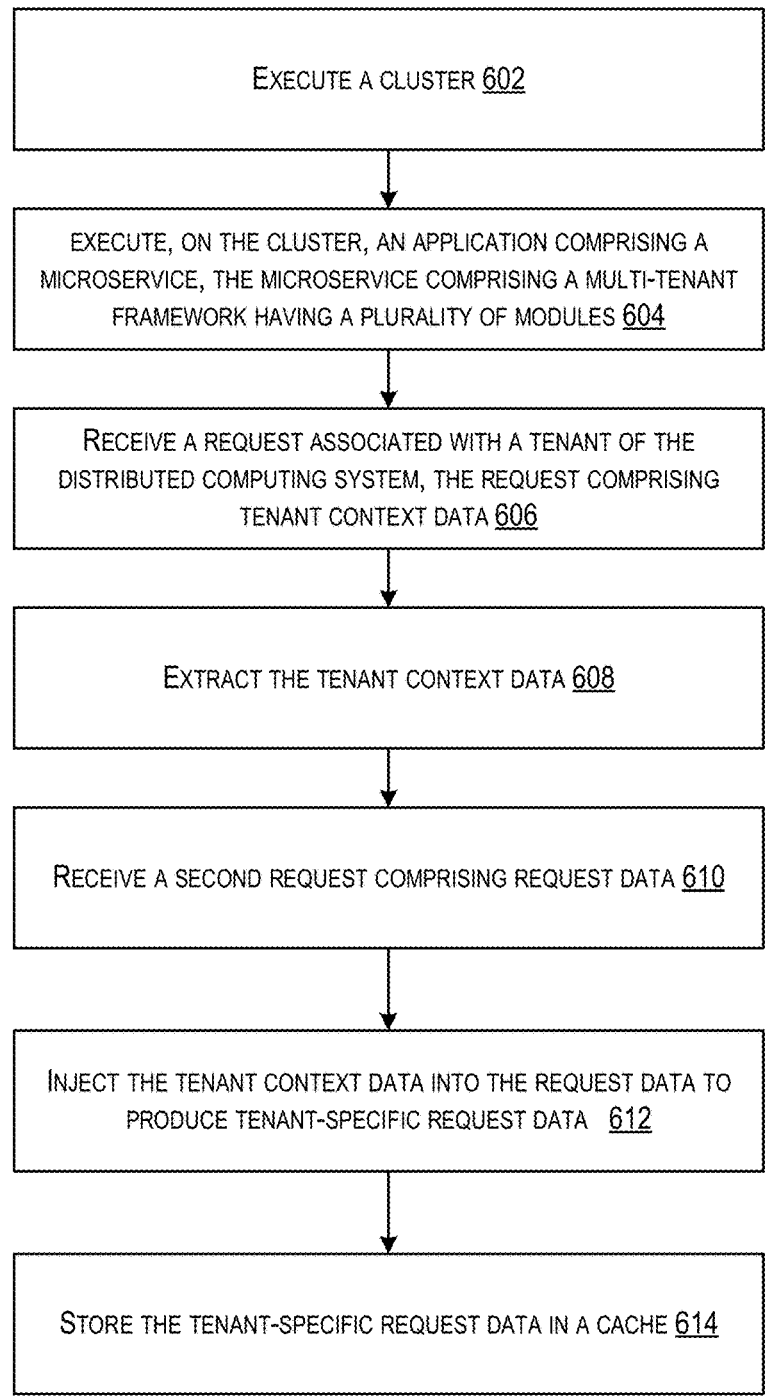
FIG. 6 is another simplified flow diagram of an example process for caching microservice data according to a tenant-specific request, according to some embodiments.

FIG. 6 is another simplified flow diagram of an example process 600 for caching microservice data according to a tenant-specific request, according to some embodiments. The microservice may be similar to other microservices described herein, including microservice 300 of FIG. 3, which in turn may be executed as part of a microservices-based application by a distributed computing system, for example distributed computing system 200 of FIG. 2. One or more of the operations of process 600 may be similar to operations of process 400.

Process 600 may begin at block 602 similarly to process 400 with the execution of a cluster (e.g., a multi-tenant cluster) by a distributed computing system. At blocks 604-608, an application can be executed by the distributed computing system on the cluster. The application can include a microservice having a multi-tenant framework (e.g., multi-tenant framework 302) with a plurality of modules. The microservice can receive a request that includes tenant context data, which can include a tenant identifier or other identifier. A module of the multi-tenant framework (e.g., interface interceptor 310) can extract the tenant context data from the request.

At block 610, the microservice can receive a second request. The second request can include request data as part of its payload. For example, the request data may be data sent to the microservice by a tenant manager service (e.g., tenant manager service 224) and include tenant database configuration information. The tenant database configuration information may be cached for later use by the microservice (or another microservice of the application).

To cache the request data, the microservice can inject the tenant context data into the request data to produce tenant-specific request data, at block 612. In some embodiments, injecting the tenant context data can include appending or prepending the request data with the tenant identifier included in the tenant context data. In other embodiments, the tenant context data is injected by writing the tenant context data into the cache along with the request data, such that the cached request data is tenant-specific request data. At block 614, the microservice can store the tenant-specific request data in a cache (e.g., cache 230). As an example, for request data that includes tenant database configuration information, the configuration information can be stored in the cache with the tenant identifier prepended to the cached blocks of data. When retrieving cached data (e.g., based on a request), the multi-tenant framework can use tenant context data from the retrieval request to determine which cached data to retrieve. In this way, the core microservice process may not handle tenant-specific caching directly, and may instead leverage a module of the multi-tenant framework.

Figure 7:
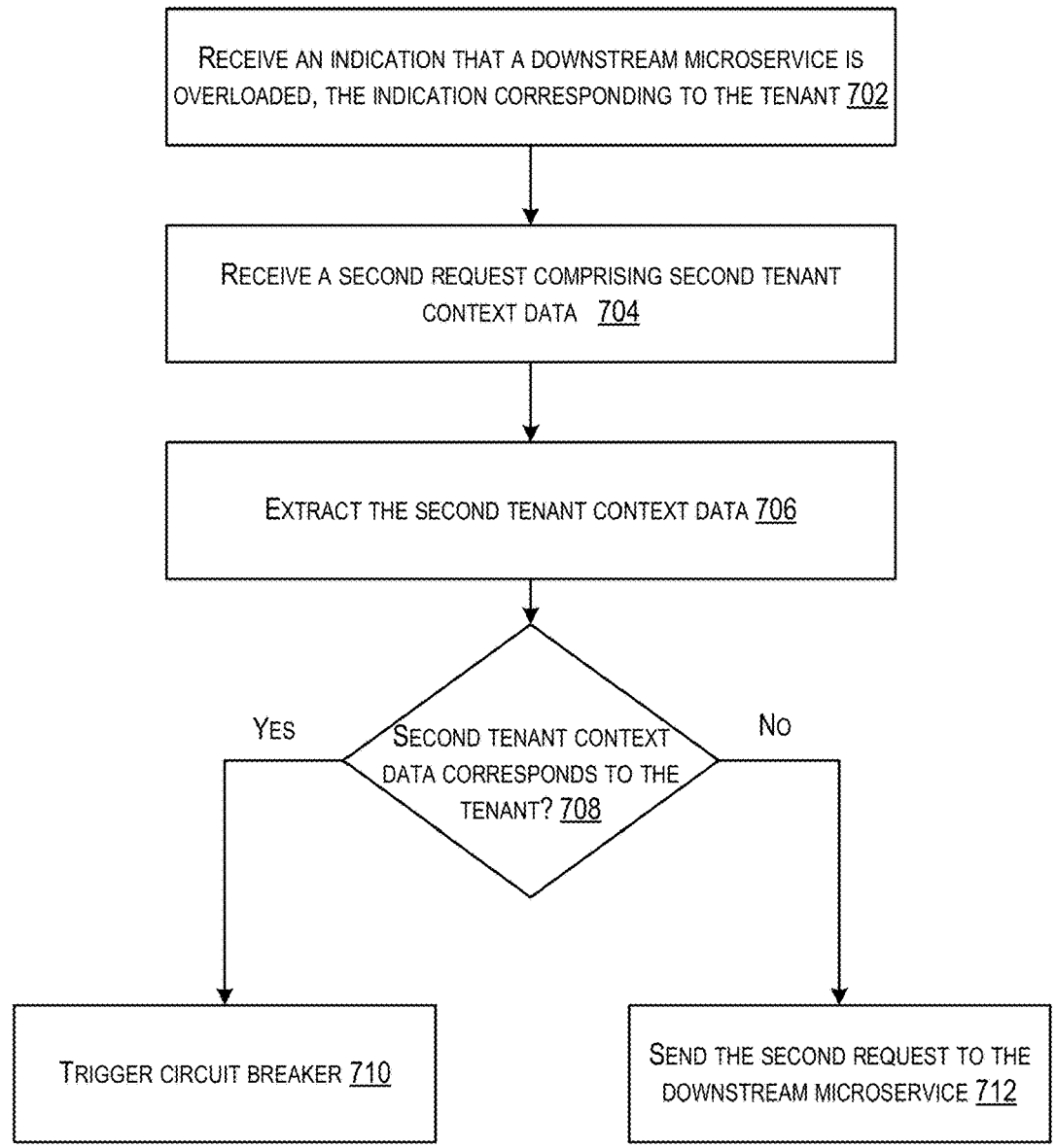
FIG. 7 is a simplified flow diagram of an example process for implementing tenant-specific circuit breaking for request traffic within a multi-tenant microservices-based application, according to some embodiments.

FIG. 7 is a simplified flow diagram of an example process 700 for implementing tenant-specific circuit breaking for request traffic within a multi-tenant microservices-based application, according to some embodiments. The microservices-based application may be similar to other microservices-based applications described herein, including microservices-based application 210. Process 700 may occur following some, any, or all of the operations described above with respect to processes 400-600. For example, process 700 may occur after a distributed computing system (e.g., distributed computing system 200) executes a cluster and the microservices-based application and a microservice of the microservices-based application receives a first request containing tenant context data (e.g., operations described with respect to blocks 402-408 of FIG. 4).

Process 700 may begin at block 702, with a microservice of the microservices-based application receiving an indication that a downstream microservice is overloaded. An overloaded microservice may be an microservice that receives too many requests in a defined period of time (e.g., a high request rate), an microservice whose computational performance has degraded below a defined threshold (e.g., unable to process and complete requests in a specific time limit), or other characteristic of a computational process that may be unable to handle additional requests.

Subsequently, the microservice can receive a second request that includes second tenant context data, at block 704. The second tenant context data may include a tenant identifier corresponding to the same tenant as the indication of block 702, or may include a tenant identifier corresponding to another tenant of the distributed computing system. At block 706, a module (e.g., interface interceptor 310) of a multi-tenant framework of the microservice can extract the second tenant context data.

At decision 708, a second module (e.g., a multi-tenant resiliency manager 3320 of the multi-tenant framework can determine whether the second tenant context data corresponds to the overloading tenant associated with the indication of block 702, or a different tenant. If the second tenant context data does correspond to the overloading tenant, then the second request may exceed a circuit breaking policy associated with that tenant. Accordingly, at block 710 the second module can trigger the circuit breaker (e.g., circuit breaking policy) and not send the second request to the downstream microservice, or take another action defined by the policy (e.g., send an alert).

If the second tenant context data does not correspond to the overloading tenant, then the microservice may send the second request to the downstream microservice, at block 712. The downstream microservice may only be overloaded with respect to the overloading tenant. The downstream microservice may be able to handle the second request from a different tenant.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
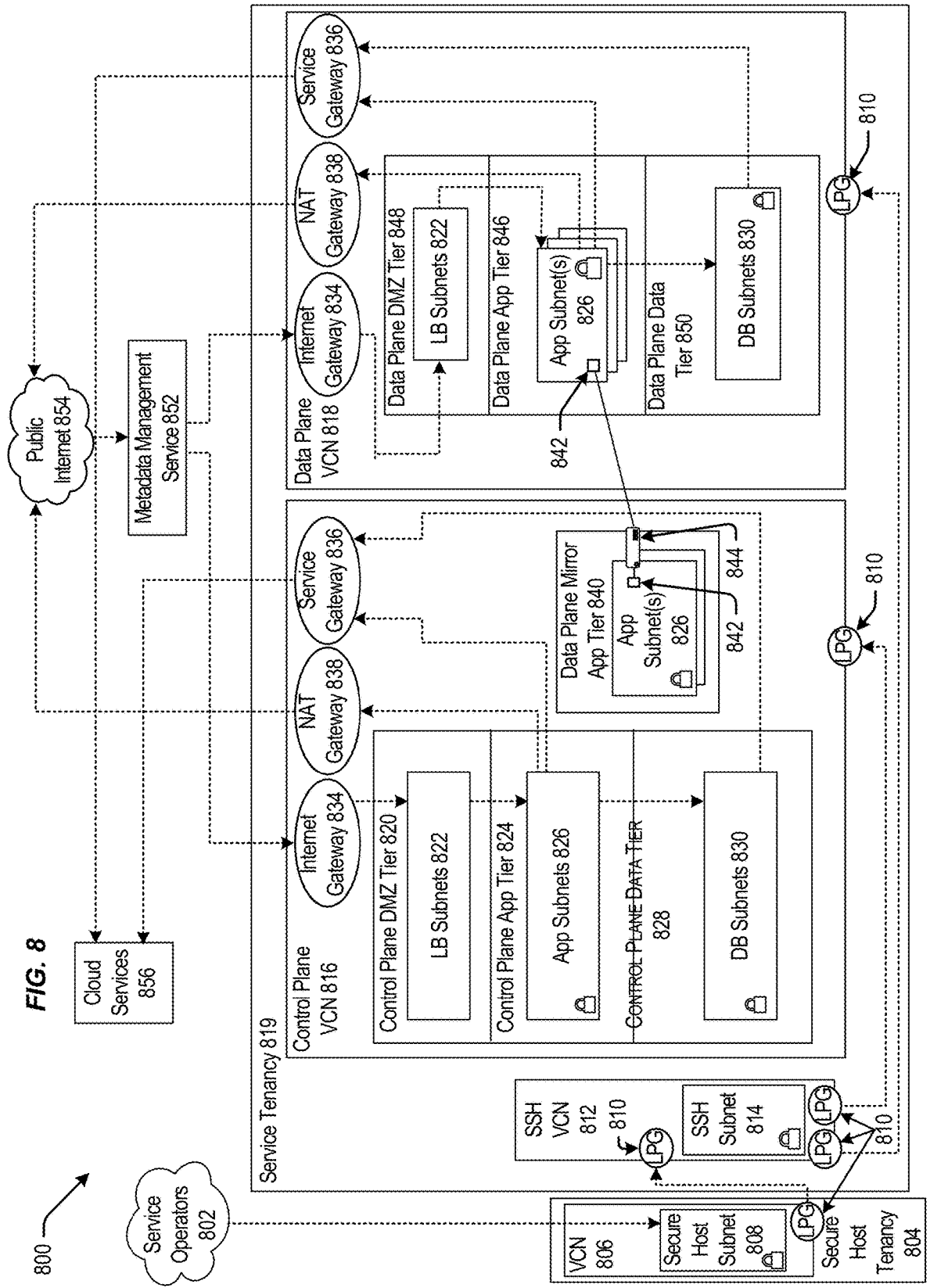
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
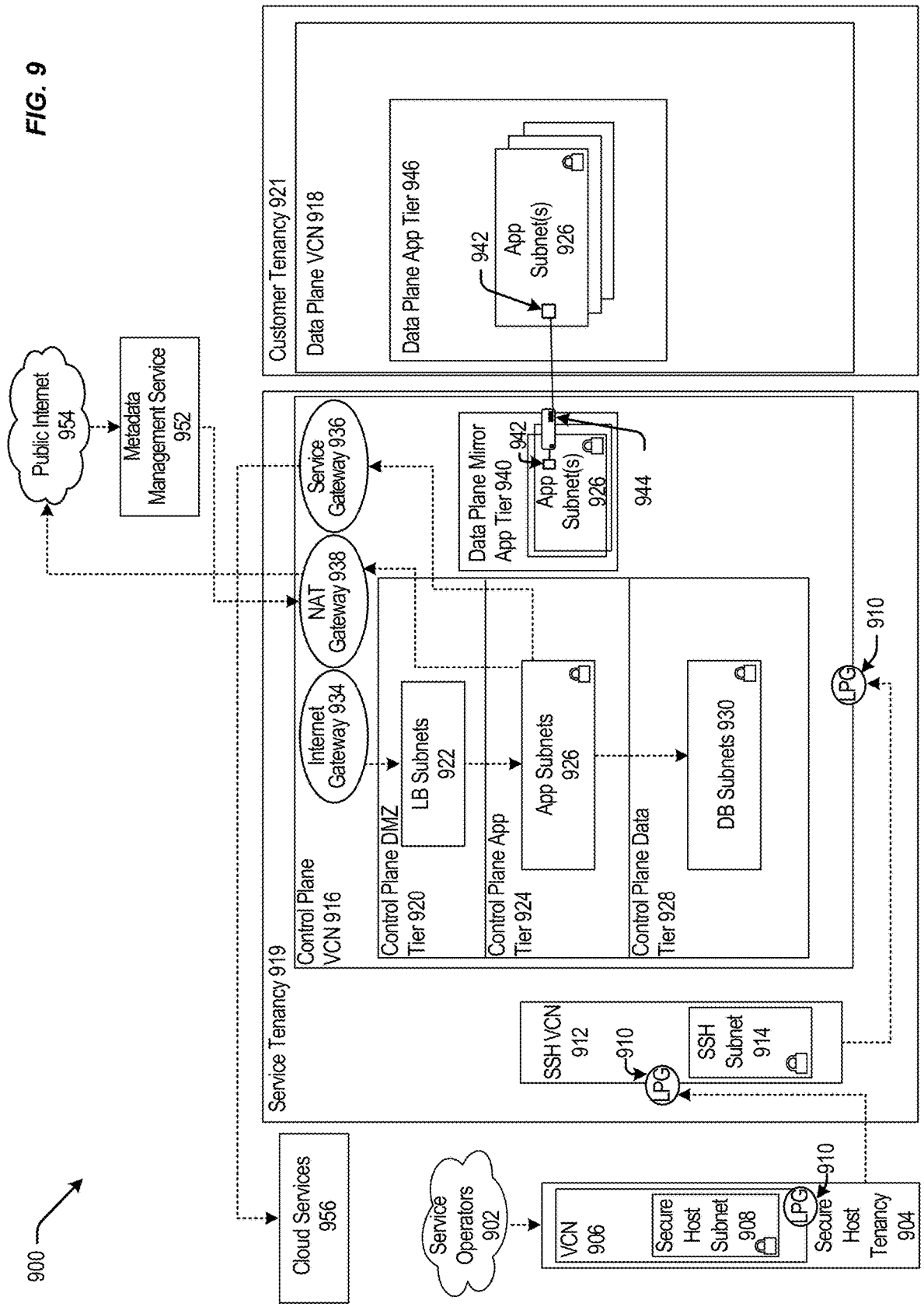
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
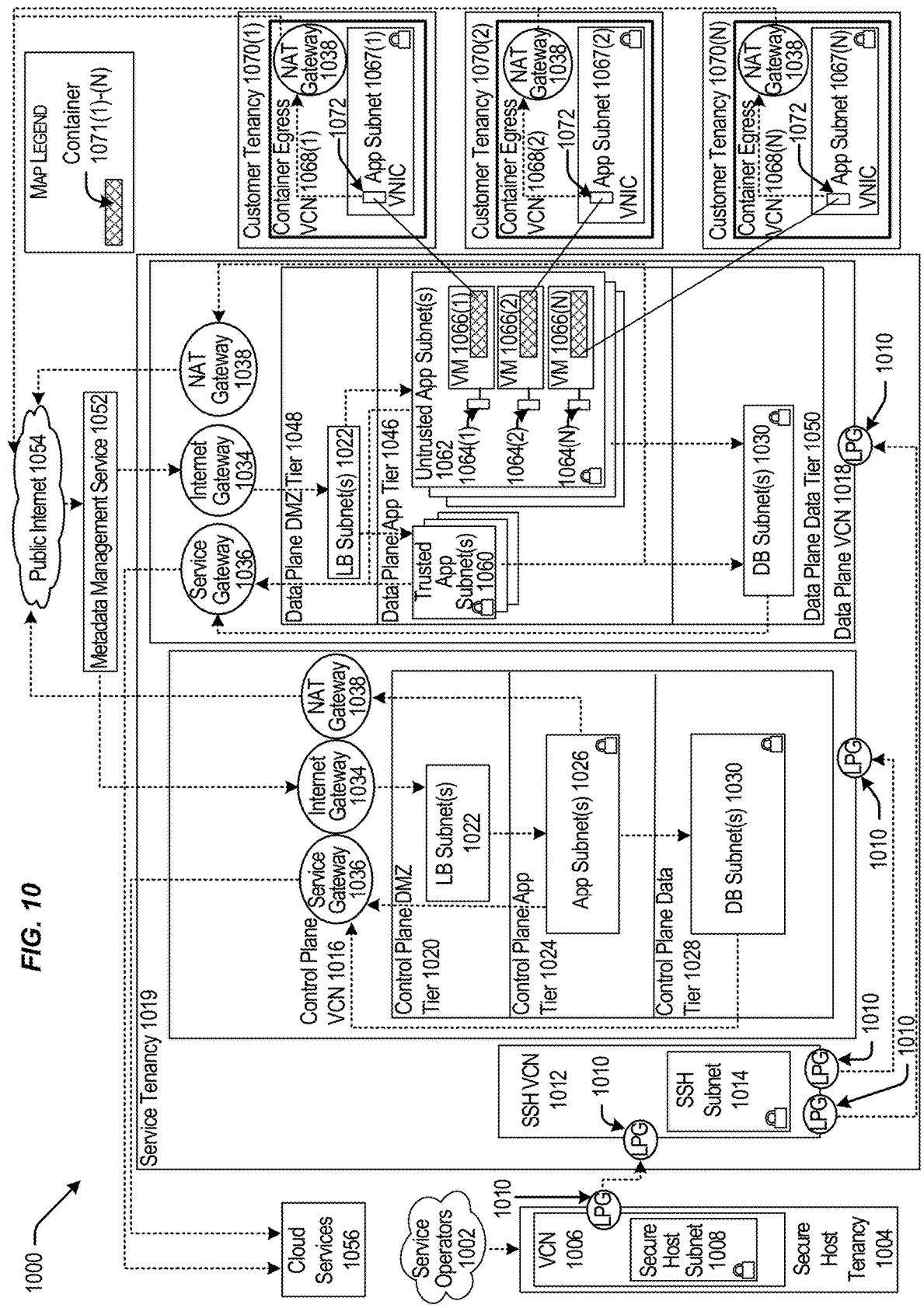
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
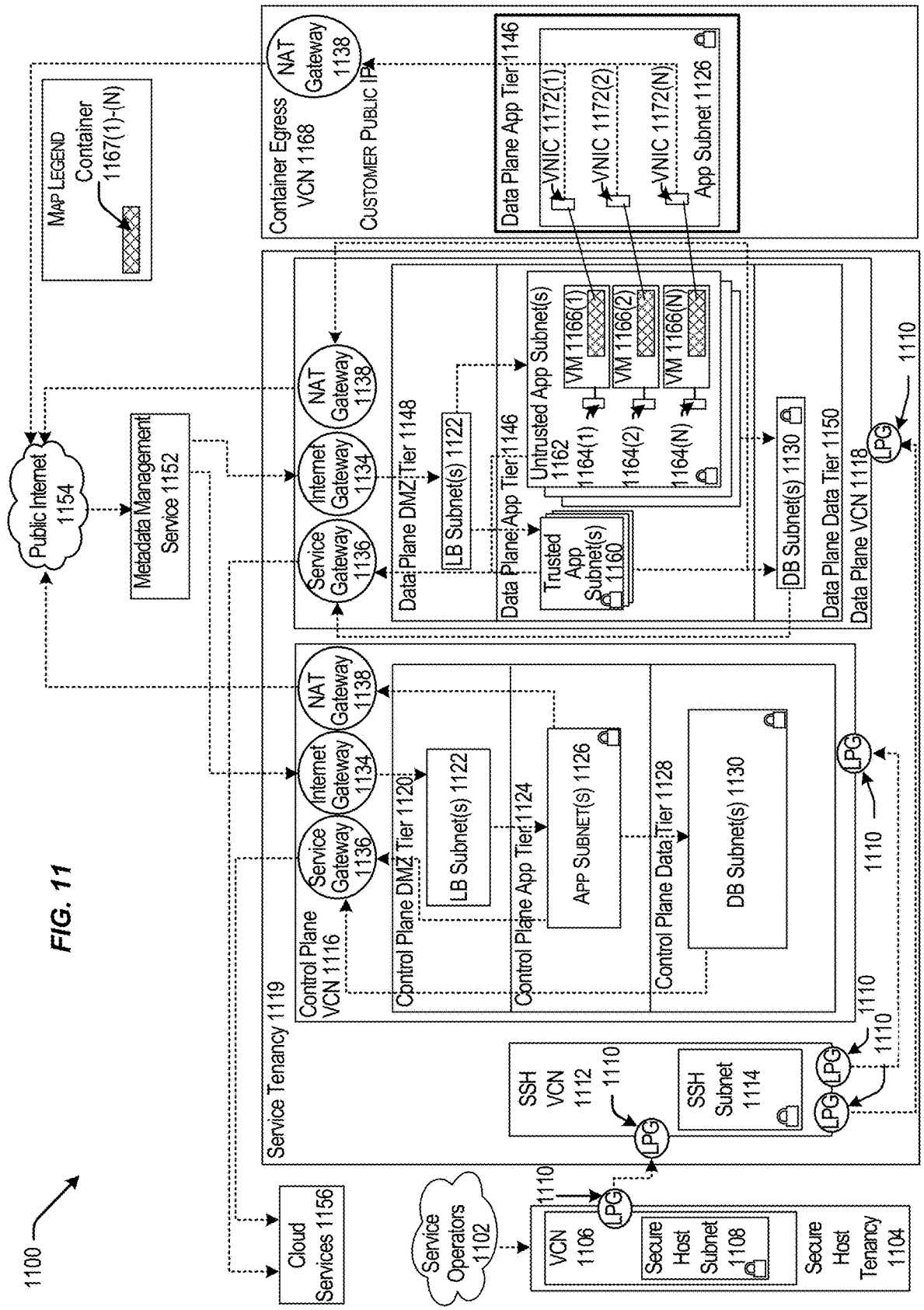
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
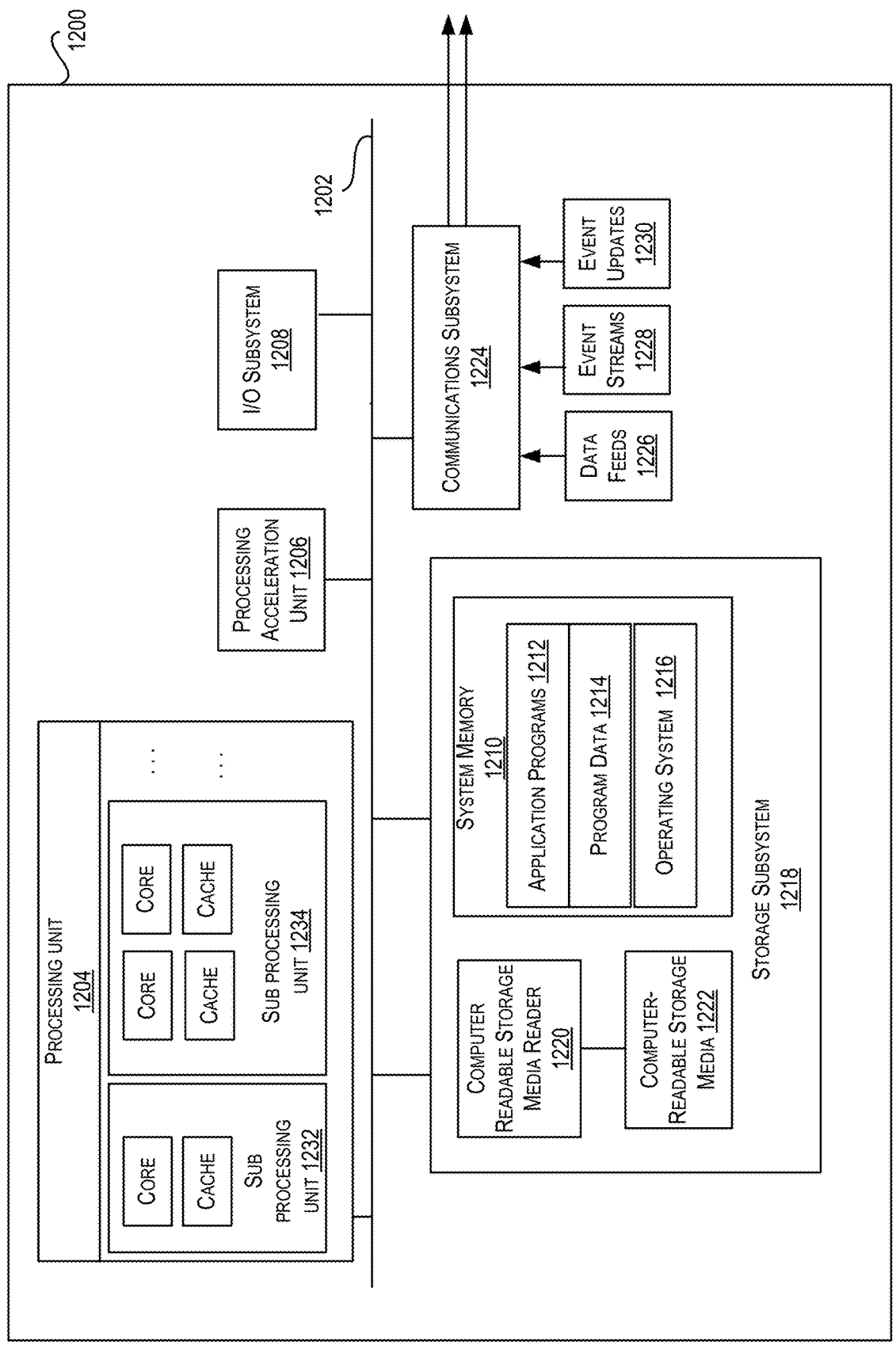
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer implemented method, comprising:
   receiving, at an interface of a microservice executing within a distributed computing system, a first request associated with a tenant of the distributed computing system, the microservice comprising a multi-tenant framework having a plurality of software components, the microservice agnostic to the tenant of the distributed computing system, and the first request comprising tenant context data;
   extracting, by a first software component of the plurality of software components, the tenant context data, the first software component corresponding to the interface;
   receiving, at the interface of the microservice, a second request comprising request data; and
   storing, by a second software component of the plurality of software components and using the tenant context data, the request data in a cache.

2. The computer implemented method of claim 1, wherein receiving the second request comprises receiving the second request from a tenant manager service executing within the distributed computing system.

3. The computer implemented method of claim 1, wherein the request data comprises tenant database configuration information.

4. The computer implemented method of claim 1, wherein storing the request data using the tenant context data comprises injecting the tenant context data into a caching request generated by the microservice.

5. The computer implemented method of claim 1, wherein storing the request data using the tenant context data comprises storing the tenant context data in the cache with the request data, the tenant context data associated with the request data in the cache.

6. The computer implemented method of claim 1, wherein the second software component comprises a multi-tenant cache manager.

7. The computer implemented method of claim 1, further comprising:
   determining, by the second software component using an eviction rule associated with the tenant, that the request data is invalid; and
   in accordance with a determination that the request data is invalid, evicting, by the second software component and using the tenant context data, the request data from the cache.

8. The computer implemented method of claim 7, wherein evicting the request data comprises:
   identifying the request data using the tenant context data; and
   removing the request data from the cache.

9. A distributed computing system, comprising:
   one or more processors; and
   one or more memories storing computer-executable instructions that when executed by the one or more processors, cause the distributed computing system to:
   receive, at an interface of a microservice executing within the distributed computing system, a first request associated with a tenant of the distributed computing system, the microservice comprising a multi-tenant framework having a plurality of software components, the microservice agnostic to the tenant of the distributed computing system, and the first request comprising tenant context data;
   extract, by a first software component of the plurality of software components, the tenant context data, the first software component corresponding to the interface;
   receive, at the interface of the microservice, a second request comprising request data; and
   store, by a second software component of the plurality of software components and using the tenant context data, the request data in a cache.

10. The distributed computing system of claim 9, wherein receiving the second request comprises receiving the second request from a tenant manager service executing within the distributed computing system.

11. The distributed computing system of claim 9, wherein the request data comprises tenant database configuration information.

12. The distributed computing system of claim 9, wherein storing the request data using the tenant context data comprises injecting the tenant context data into a caching request generated by the microservice.

13. The distributed computing system of claim 9, wherein storing the request data using the tenant context data comprises storing the tenant context data in the cache with the request data, the tenant context data associated with the request data in the cache.

14. The distributed computing system of claim 9, wherein the second software component comprises a multi-tenant cache manager.

15. The distributed computing system of claim 9, wherein the one or more memories store additional instructions that, when executed by the one or more processors, cause the distributed computing system to further:
   determine, by the second software component using an eviction rule associated with the tenant, that the request data is invalid; and
   in accordance with a determination that the request data is invalid, evict, by the second software component and using the tenant context data, the request data from the cache.

16. The distributed computing system of claim 15, wherein evicting the request data comprises:
   identifying the request data using the tenant context data; and
   removing the request data from the cache.

17. A non-transitory computer-readable storage medium comprising executable instructions that, when executed by one or more processors of a distributed computing system, cause the distributed computing system to:
   receive, at an interface of a microservice executing within the distributed computing system, a first request associated with a tenant of the distributed computing system, the microservice comprising a multi-tenant framework having a plurality of software components, the microservice agnostic to the tenant of the distributed computing system, and the first request comprising tenant context data;

extract, by a first software component of the plurality of software components, the tenant context data, the first software component corresponding to the interface;

receive, at the interface of the microservice, a second request comprising request data; and store, by a second software component of the plurality of software components and using the tenant context data, the request data in a cache.

18. The non-transitory computer-readable storage medium of claim 17, wherein storing the request data using the tenant context data comprises injecting the tenant context data into a caching request generated by the microservice.

19. The non-transitory computer-readable storage medium of claim 17, wherein storing the request data using the tenant context data comprises storing the tenant context data in the cache with the request data, the tenant context data associated with the request data in the cache.

20. The non-transitory computer-readable storage medium of claim 17, comprising additional instructions that, when executed by the one or more processors, cause the distributed computing system to further:

determine, by the second software component using an eviction rule associated with the tenant, that the request data is invalid; and in accordance with a determination that the request data is invalid, evict, by the second software component and using the tenant context data, the request data from the cache.

* * * * *